Figure 1:
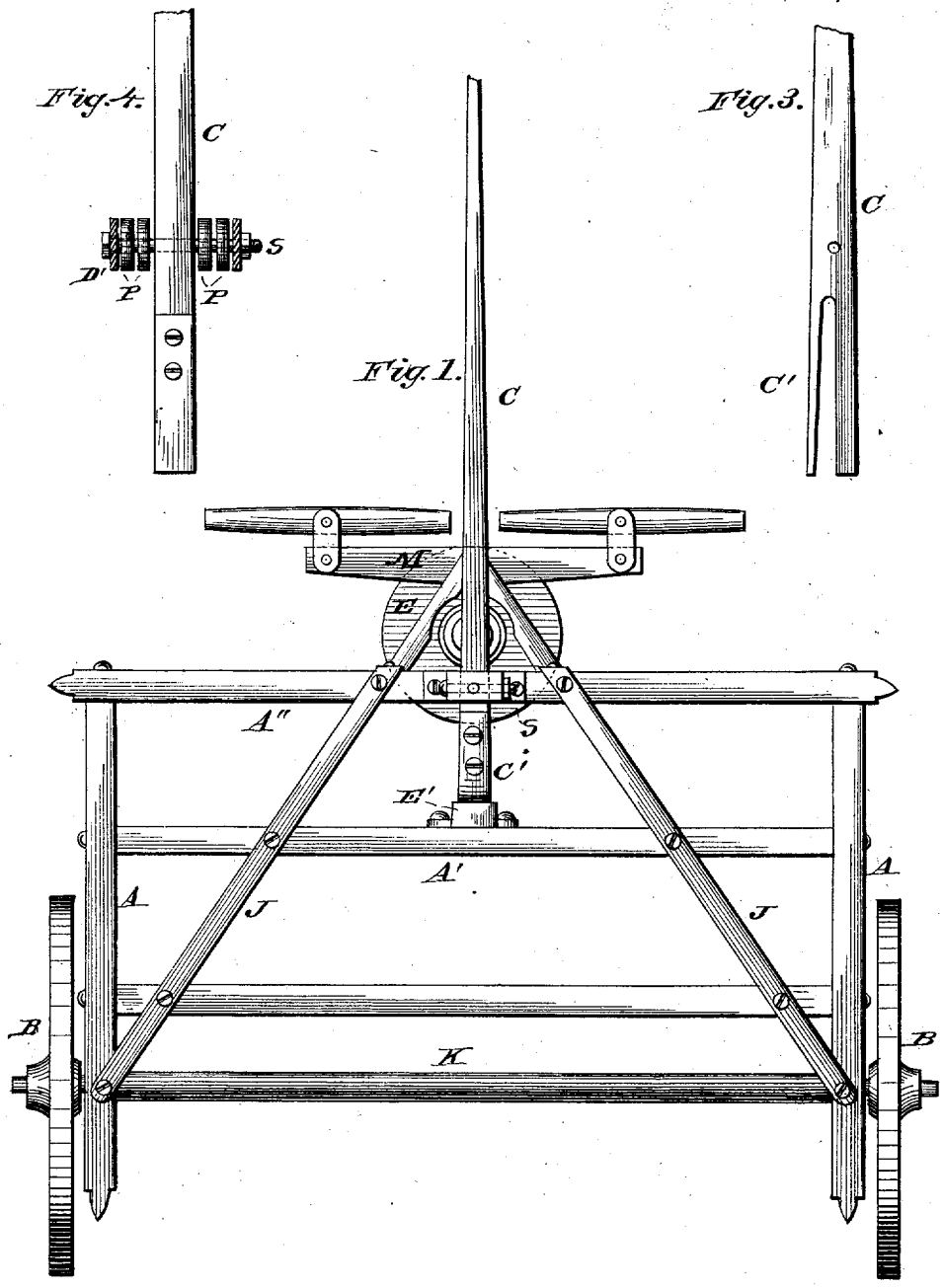

2 Sheets—Sheet 1.

H. OGBORN,

Assignor, by mesne assignments, to THE RICHMOND CASTER COMPANY.

SEEDING MACHINE.

No. 9,938. Reissued Nov. 22, 1881.

WITNESSES

Fred. G. Dieterich

P. C. Dieterich

INVENTOR

Harrison Ogborn by De Witt C. Allen Attorney

N. PETERS, Photo-Lithographer, Washington, D. C.

2 Sheets—Sheet 2.

H. OGBORN,

Assignor, by mesne assignments, to THE RICHMOND CASTER COMPANY.

SEEDING MACHINE.

No. 9,938. Reissued Nov. 22, 1881.

WITNESSES

Fred. G. Dieterich.

P. C. Dieterich.

INVENTOR

Harrison Ogborn by DeWitt C. Allen Attorney

N. PETERS, Photo-Lithographer, Washington, D. C.

UNITED STATES PATENT OFFICE.

HARRISON OGBORN, OF RICHMOND, INDIANA, ASSIGNOR, BY MESNE ASSIGNMENTS, TO THE RICHMOND CASTER COMPANY, OF SAME PLACE.

SEEDING-MACHINE.

SPECIFICATION forming part of Reissued Letters Patent No. 9,938, dated November 22, 1881.

Original No. 240,535, dated April 26, 1881. Application for reissue filed September 14, 1881.

*To all whom it may concern:*

Be it known that I, HARRISON OGBORN, a citizen of the United States, residing at Richmond, in the county of Wayne and State of Indiana, have invented certain new and useful Improvements in Seeding-Machines and other Agricultural Implements; and I do hereby declare the following to be a full, clear, and exact description of the invention, that will enable others skilled in the art to which it appertains to make and use the same, reference being had to the accompanying drawings, and to the letters of reference marked thereon, which form a part of this specification.

Experience has demonstrated that in grain-drills and other seeding-machines the downward weight and pressure of the machine on the necks of the team when in operation is, under the most favorable conditions, over one hundred pounds, and in rough ground often is increased to four hundred pounds or more.

The object of my invention is to overcome the above-described defects by supporting the front of seeding machines and other agricultural implements in such manner that the weight and downward pressure is entirely removed from the necks of the team; in lessening or preventing side lurch of the tongue, while also removing its weight from the necks of the team; in permitting the frame of the machine to be made much lighter and broader, so that it will be held more rigidly in place; and in steadying the machine, so that it will always accommodate itself to unevenness of surface on rough or hilly ground, thus insuring the distribution of the grain at a more uniform and even depth in the ground.

My invention therefore consists, essentially, in the combination, with the supporting-frame of a seeding-machine or other agricultural implement, of a caster saddle and wheel connected to said frame substantially at or near its front central point, or the point of attachment of the draft device and tongue, and an anti-friction wheel or roller arranged between said caster saddle and frame of the machine.

It further consists, in connection with the above-described features, of a tongue made flexible by its connection to the machine; and, finally, in novel features of construction and combination and arrangement of parts, all as will be hereinafter fully described, and specifically designated in the claims.

Figure 2:
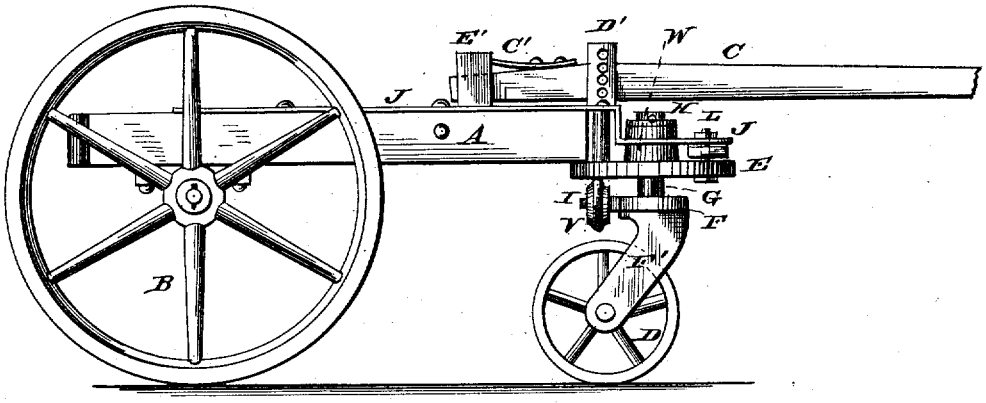
Figure 5:
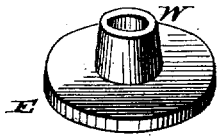
Figure 8:
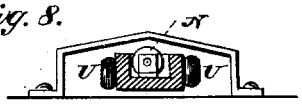
Figure 6:
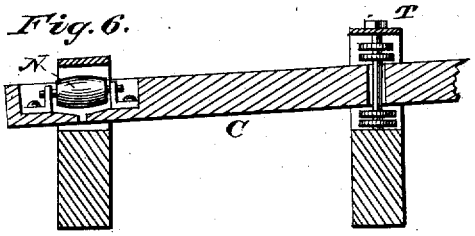
Figure 9:
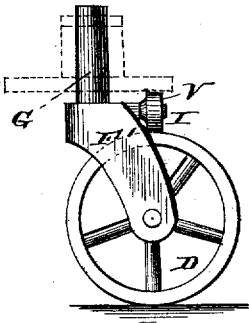
Figure 7:
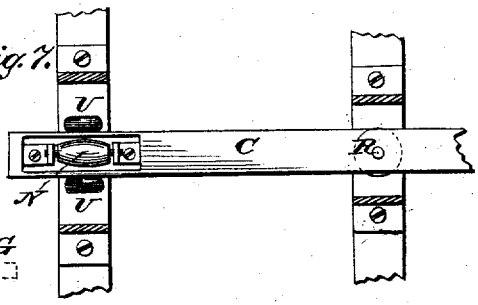
Figure 10:
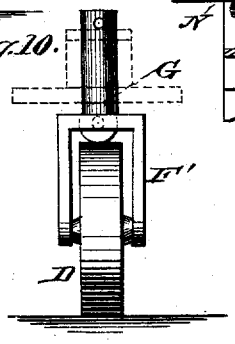

Referring to the accompanying drawings, Figure 1 represents a top view or plan; Fig. 2, a side elevation of the same; Fig. 3, a side elevation of the rear end of the tongue; Fig. 4, a top view or plan of the same; Fig. 5, a perspective view of the upper caster-plate; Fig. 6, a longitudinal vertical section of the rear end of the tongue and a cross-section of the frame-timbers to which the tongue is attached; Fig. 7, a top view or plan of the rear end of the tongue as applied to the frame; Fig. 8, a front elevation of the standard that retains the rear end of the tongue, as shown in Figs. 6 and 7; Fig. 9, a side elevation, and Fig. 10 a rear elevation, of the caster.

In the drawings, A represents the frame of the machine; B, the carrying-wheels; C, the tongue, and D the caster which supports the front of the frame. The upper plate, E, of the caster is attached centrally to the front of the frame, as seen in Figs. 1 and 2. The lower plate or saddle, F, of the caster has the horns F′, for carrying the wheel D, and also the stem G, which passes through the upper plate, E, and sleeve W, attached thereto, and held in position by means of a pin and washer, as seen at H, Fig. 2. The caster frame or saddle F carries an anti-friction wheel or roller, V, (shown more clearly in Fig. 2,) and which wheel or roller is loosely mounted on the bearing-lug I and runs near the outer edge on the under side of the upper caster-plate, E, and in such position as to support the weight above and throw it directly over the axis of the caster-wheel D, thereby permitting of the perfect play of the caster in all directions while removing the friction from the caster-stem.

The brace-bars J J extend diagonally across the machine-frame, as seen in Fig. 1, and their rear ends are attached to the side rails of the frame above the axle K and extend forward diagonally across the transverse ties of the frame, and are bent downward at the front rail of the frame and thence forward diagonally across the double-tree, where the two braces meet and receive the bolt L through holes near their ends. This bolt also passes through the double-tree and the upper plate of the caster which supports the double-tree, the bolt L acting as a pivot for the double-tree, as seen in Fig. 2, so that the double-tree is firmly attached to the machine and independently of the tongue. The tongue is attached to the frame in such a manner as to make it flexible, detachable, and adjustable, as follows: The standard or support D′ is attached centrally to the upper side of the front rail of the frame and receives the tongue between its vertical sides, which are provided with a series of holes for the adjustment of the tongue, as seen in Fig. 2. A top view or plan, with the standard in cross-section, is shown in Fig. 4, where rubber or any other elastic washers, buffers, or springs are provided to deaden the lateral side lurch of the tongue against the team. The rear end of the tongue is supported in a bearing, E′, attached to a cross-rail of the frame, as seen in Figs. 1 and 2.

A spring, C′, at the rear end of the tongue extends into the support or bearing E′, to prevent concussion when the caster or either of the rear wheels strikes or passes over an obstruction. This spring may be formed as an integral part of the tongue, as shown in Fig. 3, or made and attached otherwise. The holes in the vertical sides of the standard D′ are to permit of the vertical adjustment of the front end of the tongue by means of the bolt S, to suit the height of the team and to remove the weight of the tongue from their necks.

As a modification of my improvement, the spring C′ may be dispensed with and an anti-friction wheel or roller, N, applied near the rear end of the tongue, said wheel or roller moving in a proper retainer, as seen in Figs. 6, 7, and 8. This modified tongue is held in place by a bolt, T, passing vertically through the support D′, the tongue, the buffers, and into the front rail of the frame.

Near the rear end of the tongue, at the sides, buffers or springs U are attached to prevent side lurch of the tongue. The spring washers or buffers R, Fig. 7, regulate the elevation or depression of the front end of the tongue by being placed above or below it, in connection with the retainer E′.

The advantages of my construction are that the machine is perfectly balanced, the front part carried and supported by the caster, the downward weight and pressure removed from the necks of the team, and the side lurch of the tongue prevented by means of the spring-buffers, and the perfect adjustability of the tongue to take even the weight of the tongue off the necks of any height of team, and at the same time be readily attached to and detached from the frame. The tongue, being merely for guiding the machine, may be much lighter and yet stronger by means of the great strength and firmness given to it by the diagonal braces attached thereto.

Heretofore the only caster ever employed under the front central point of the frame of a grain-drill for a similar purpose has been the old style of caster having a stem passing up through the frame, and which has failed in its offices because of the great friction between its plate and the frame of the drill. My improved attachment overcomes all friction between the caster and the drill-frame; and on account of the great facility with which the caster-wheel revolves on its axis and turns upon its stem, and by reason of the support given to the front of the machine and freedom from friction attained by the anti-friction wheel or roller arranged between the lower caster-plate or saddle and the frame of the machine, I am enabled to support and sustain the weight of the front part of the machine and the tongue, and thus produce a machine that may be turned round readily and easily on a very small space of ground, easily moved forward and backward, and the injury to horses' necks prevented that occurs when using the old style of machines.

Besides the relief given to the team or horses by my improved attachment, another important result it obtains is the steadiness it gives to the machine. In all seeding implements to which the tongue is rigidly connected the depth of the teeth or hoes in the ground is necessarily regulated to some extent by the height of the front end of the tongue, which is itself regulated by the height of the horses. Therefore, where the drill or seeding-machine is used on hilly ground and the horses and the rear of the machine are on a different level, distribution of the grain at an even depth is impossible. The flexible tongue overcomes this defect by making the depth of the teeth in the ground entirely independent of the action of the tongue, and with my improved caster attachment the drill will rest upon the ground on three points, similar to a three-legged stool, and it will always accommodate itself to unevenness of surface; and the added steadiness of movement of the machine also lessens the side lurching observable in the ordinary drills, which causes irregularity in the sowing of the grain. My machine is also free from other objections common to other machines made in the usual manner.

Having thus described my invention, what I claim as new, and desire to secure by Letters Patent, is—

1. The combination, with the supporting-frame of a seeding machine or other agricultural implement, of a caster saddle and wheel connected to said frame substantially at or near its front central point, or the point of attachment of the draft device and tongue, and an anti-friction wheel or roller arranged between said caster-saddle and supporting-frame, substantially as and for the purposes specified.

2. The combination, with the supporting-frame of a seeding-machine or other agricultural implement, of a caster-plate connected to said frame substantially at or near its front central point, or point of attachment of the draft device and tongue, a caster saddle and wheel, and an anti-friction wheel or roller arranged between said caster-saddle and caster-plate, substantially as and for the purposes specified.

3. The combination, with the supporting-frame of a seeding-machine or other agricultural implement, of a caster saddle and wheel connected to said frame substantially at or near its front central point, or the point of attachment of the draft device, an anti-friction wheel or roller arranged between said caster saddle and frame, and a tongue made flexible by its connection to said frame, substantially as and for the purposes specified.

4. The combination, with the supporting-frame of a seeding-machine or other agricultural implement, of a caster-plate connected to said frame substantially at or near its front central point, or point of attachment of the draft device, a caster saddle and wheel, an anti-friction wheel or roller arranged between said caster-plate and caster-saddle, and a tongue made flexible by its connection to said frame, substantially as and for the purpose specified.

5. The combination, with the supporting-frame of a seeding-machine or other agricultural implement, of a caster-plate connected to said frame substantially at or near its front central point, and a double-tree connected to and supported by said caster-plate, substantially as and for the purpose specified.

6. The combination, with the supporting-frame of a seeding-machine or other agricultural implement, of a caster-plate connected to said frame substantially at or near its front central point, a double-tree connected to and supported by said caster-plate, and a tongue flexibly connected to said frame, substantially as and for the purpose specified.

7. The caster-saddle D, having the horizontal projecting lug I, supported at one end only, and cast as an integral part thereof, or otherwise rigidly attached thereto, for the purposes and uses substantially as set forth.

8. The caster-saddle D, provided with the horizontal projecting lug I, supported at one end only, and cast as an integral part thereof, or otherwise rigidly attached thereto, in combination with the wheel V, for the purposes and in the manner herein set forth.

9. The caster-saddle having the horizontal lug I, supported at one end only, and cast as an integral part thereof, or otherwise rigidly attached thereto, and the wheel V, in combination with plate or saddle F, stem G, sleeve W, horns F′, and wheel D, substantially as set forth.

10. Frame A, in combination with the caster, composed of the plate F, provided with lug I, horns F′, and stem G, plate E, wheel D, and wheel V, for supporting the front of the machine and tongue, substantially as set forth.

11. In combination, the double-tree M, attached to the plate E of the caster and to the brace-bars J J by means of the bolt L, substantially as set forth.

12. The brace-bars J J, arranged to pass diagonally forward from the side rails of the frame A and across bars A′ and front rails, A″, to meet in front, in combination with double-tree M and plate E, said bars being rigidly attached to the frame A, substantially as set forth.

13. The combination and arrangement of the herein-described caster, the pivoted adjustable and detachable tongue C, and spring C′, standard D′, bearing E′, buffers P P, and bolt S, substantially as and for the purposes set forth.

14. The combination, with the supporting-frame of a seeding-machine or other agricultural implement, of a caster connected to said frame substantially at or near its front central point, and independently-pivoted tongue and double-tree, substantially as and for the purpose herein shown and described.

15. The combination, with the supporting-frame of a seeding-machine or other agricultural implement, of a caster-plate connected to said frame substantially at or near its front central point, a double-tree connected to said caster-plate, and a pivoted and adjustable tongue, substantially as and for the purpose herein shown and described.

In testimony whereof I affix my signature in presence of two witnesses.

HARRISON OGBORN.

Witnesses:

A. W. KENDRICK,

WM. H. OGBORN.